United States Patent
Higashiyama et al.

(10) Patent No.: US 11,458,841 B2
(45) Date of Patent: Oct. 4, 2022

(54) DISPLAY CONTROL APPARATUS, DISPLAY CONTROL METHOD, AND COMPUTER-READABLE STORAGE MEDIUM STORING PROGRAM

(71) Applicant: HONDA MOTOR CO., LTD., Tokyo (JP)

(72) Inventors: Masafumi Higashiyama, Wako (JP); Shinji Kawakami, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/186,236

(22) Filed: Feb. 26, 2021

(65) Prior Publication Data
US 2021/0291653 A1    Sep. 23, 2021

(30) Foreign Application Priority Data
Mar. 17, 2020   (JP) .............................. JP2020-046808

(51) Int. Cl.
*G06F 3/045*   (2006.01)
*G06F 3/041*   (2006.01)
(Continued)

(52) U.S. Cl.
CPC .............. *B60K 35/00* (2013.01); *G06F 3/013* (2013.01); *G06F 3/147* (2013.01); *B60K 2370/149* (2019.05); *B60K 2370/1529* (2019.05); *B60K 2370/182* (2019.05); *B60K 2370/566* (2019.05); *B60K 2370/741* (2019.05)

(58) Field of Classification Search
CPC ....................................................... G06F 3/013
See application file for complete search history.

(56) References Cited

U.S. PATENT DOCUMENTS 7,642,931 B2   1/2010   Sato
8,134,594 B2   3/2012   Nagamine et al.
(Continued)

FOREIGN PATENT DOCUMENTS

JP     2005-135037 A      5/2005
JP     2014216714 A      11/2014
(Continued)

OTHER PUBLICATIONS

Office Action for U.S. Appl. No. 17/185,113 dated Nov. 9, 2021 (Related Case).
(Continued)

*Primary Examiner* — Nan-Ying Yang
(74) *Attorney, Agent, or Firm* — Thomas | Horstemeyer, LLP (57) ABSTRACT

A display control apparatus comprises: a detection unit configured to analyze a line of sight of a driver of a vehicle, and detect a viewpoint of the driver in a visual field region of the driver that is obtained as a result of the analysis; a display control unit configured to display an image such that the image is superimposed on the visual field region, based on a result of the detection by the detection unit; and a transmission control unit configured to, if a condition is satisfied, transmit related information that is related to information represented by the image to an external terminal, in addition to or instead of the display control unit displaying the image.

12 Claims, 8 Drawing Sheets

(51) Int. Cl.
  *B60K 35/00*  (2006.01)
  *G06F 3/01*  (2006.01)
  *G06F 3/147*  (2006.01)

(56) References Cited

U.S. PATENT DOCUMENTS

| | | |
|---|---|---|
| 8,953,011 B2 | 2/2015 | Lang et al. |
| 9,513,702 B2 | 12/2016 | Cho |
| 10,456,072 B2 | 10/2019 | Okabe et al. |
| 10,868,976 B2 | 12/2020 | Kuehne |
| 2005/0107952 A1* | 5/2005 | Hoshino ............ G08G 1/0969 |
| | | 701/431 |
| 2007/0229310 A1 | 10/2007 | Sato |
| 2010/0128128 A1 | 5/2010 | Nagamine et al. |
| 2010/0134340 A1* | 6/2010 | Sotomaru ............ G08C 17/02 |
| | | 382/103 |
| 2012/0200664 A1 | 8/2012 | Lang et al. |
| 2015/0015479 A1 | 1/2015 | Cho |
| 2015/0031352 A1* | 1/2015 | Yi .................. G01C 21/206 |
| | | 455/420 |
| 2017/0350718 A1 | 12/2017 | Schulz |
| 2018/0088323 A1 | 3/2018 | Bao et al. |
| 2018/0177446 A1 | 6/2018 | Okabe et al. |
| 2018/0288337 A1 | 10/2018 | Kuehne |
| 2020/0051529 A1 | 2/2020 | Higashiyama et al. |
| 2020/0269759 A1 | 8/2020 | Watanabe et al. |
| 2021/0260999 A1 | 8/2021 | Masuya et al. |

FOREIGN PATENT DOCUMENTS

| | | |
|---|---|---|
| JP | 2017-223666 A | 12/2017 |
| WO | 2016/166791 A1 | 10/2016 |

OTHER PUBLICATIONS

File history of related U.S. Appl. No. 17/185,113, filed Feb. 25, 2021 (Related Case).

* cited by examiner

DISPLAY CONTROL APPARATUS, DISPLAY CONTROL METHOD, AND COMPUTER-READABLE STORAGE MEDIUM STORING PROGRAM

CROSS-REFERENCE TO RELATED APPLICATION(S)

This application claims priority to and the benefit of Japanese Patent Application No. 2020-046808 filed on Mar. 17, 2020, the entire disclosure of which is incorporated herein by reference.

BACKGROUND OF THE INVENTION

Field of the Invention

The present invention relates to a display control apparatus, a display control method, and a computer-readable storage medium storing a program with which an image can be displayed such that the image is superimposed on a visual field region of a driver.

Description of the Related Art

Japanese Patent Laid-Open No. 2017-223666 describes that a POI in which an occupant is interested is specified using a direction of interest of the occupant obtained by an eye tracker and position information that is based on a GPS, and information indicating a name, an address, a description, business hours, contact details, and so on, of the specified POI is presented to the occupant. Japanese Patent Laid-Open No. 2014-216714 describes that only information extracted from information on an in-vehicle HUD in accordance with a first rule is transmitted to a passenger's mobile terminal.

SUMMARY OF THE INVENTION

The present invention provides a display control apparatus, a display control method, and a computer-readable storage medium storing a program for presenting information in which a driver is interested in to the driver, using an appropriate presentation method.

The present invention in its first aspect provides a display control apparatus including: a detection unit configured to analyze a line of sight of a driver of a vehicle, and detect a viewpoint of the driver in a visual field region of the driver that is obtained as a result of the analysis; a display control unit configured to display an image such that the image is superimposed on the visual field region, based on a result of the detection by the detection unit; and a transmission control unit configured to, if a condition is satisfied, transmit related information that is related to information represented by the image to an external terminal, in addition to or instead of the display control unit displaying the image.

The present invention in its second aspect provides a display control method including: analyzing a line of sight of a driver of a vehicle, and detecting a viewpoint of the driver in a visual field region of the driver that is obtained as a result of the analysis; displaying an image such that the image is superimposed on the visual field region, based on a detection result; and if a condition is satisfied, transmitting related information that is related to information represented by the image to an external terminal, in addition to or instead of displaying the image.

The present invention in its third aspect provides a computer-readable storage medium storing a program for causing a computer to perform functions of: analyzing a line of sight of a driver of a vehicle, and detecting a viewpoint of the driver in a visual field region of the driver that is obtained as a result of the analysis; displaying an image such that the image is superimposed on the visual field region, based on a detection result; and if a condition is satisfied, transmitting related information that is related to information represented by the image to an external terminal, in addition to or instead of displaying the image.

According to the present invention, information in which a driver is interested in can be presented to the driver using an appropriate presentation method.

DESCRIPTION OF THE EMBODIMENTS

Hereinafter, embodiments will be described in detail with reference to the attached drawings. Note that the following embodiments are not intended to limit the scope of the claimed invention, and limitation is not made to an invention that requires all combinations of features described in the embodiments. Two or more of the multiple features described in the embodiments may be combined as appropriate. Furthermore, the same reference numerals are given to the same or similar configurations, and redundant description thereof is omitted.

In Japanese Patent Laid-Open No. 2017-223666, it is possible that an occupant cannot sufficiently check the presented detailed information during driving. Japanese Patent Laid-Open No. 2014-216714 does not mention that information is transmitted to a driver's mobile terminal.

According to one aspect of the present invention, information in which a driver is interested can be presented to the driver using an appropriate presentation method.

First Embodiment

Figure 1:
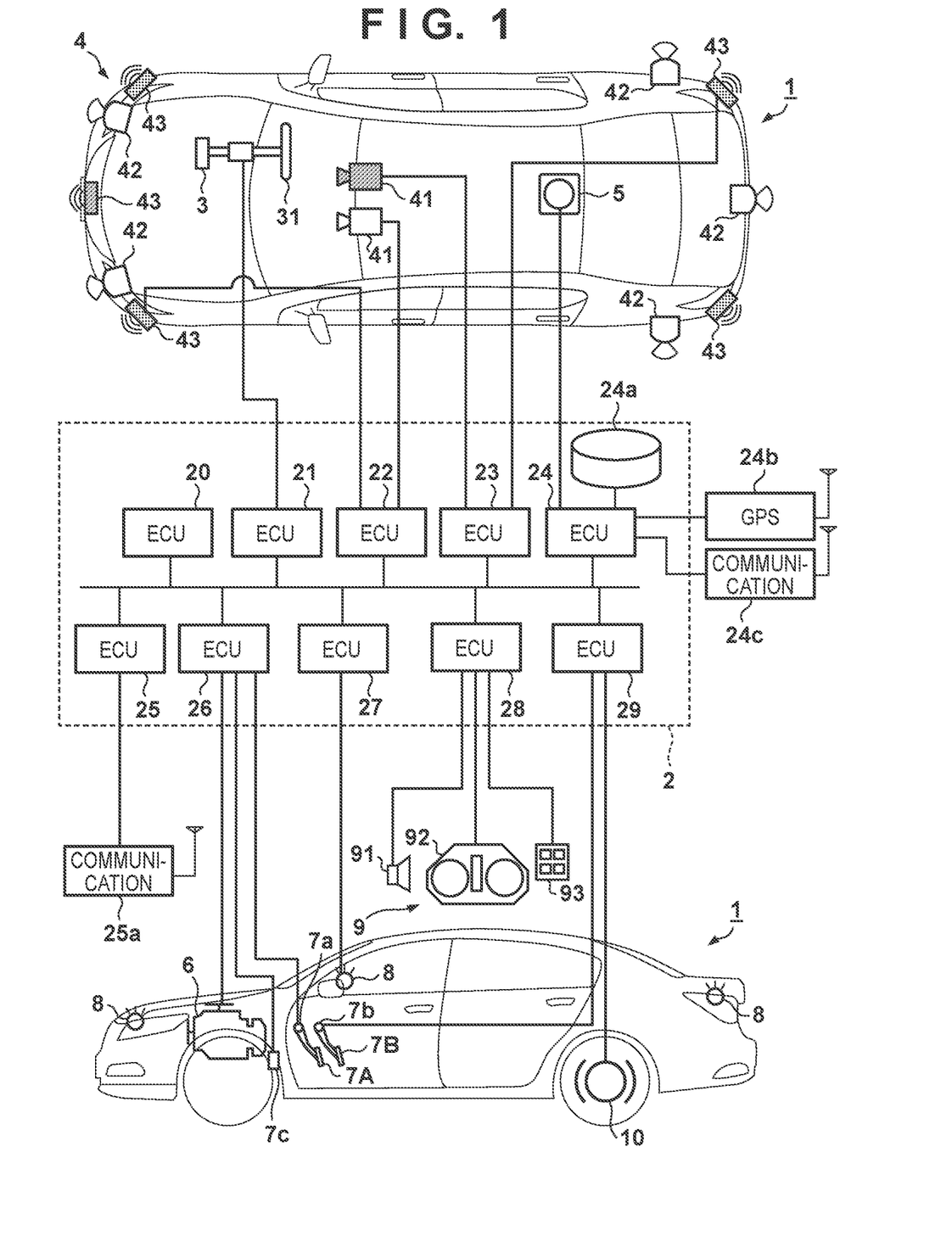
FIG. 1 is a block diagram of a control apparatus for a vehicle (travel control apparatus).

FIG. 1 is a block diagram of a control apparatus for a vehicle (travel control apparatus) according to an embodiment of the present invention, and controls a vehicle 1. In FIG. 1, an overview of the vehicle 1 is shown in a plan view and a side view. As an example, the vehicle 1 is a sedan type four-wheeled passenger car. Note that although the present embodiment will describe, as an example configuration of the vehicle 1, a vehicle configured to be able to realize automated driving and driving assistance functions, the configuration of the vehicle 1 is not limited to that described below as long as it is equipped with a later-described head-up display (HUD) configuration.

The control apparatus in FIG. 1 includes a control unit 2. The control unit 2 includes a plurality of ECUs 20 to 29, which are communicably connected to each other by a vehicle network. Each of the ECUs includes a processor, which is typified by a CPU, a storage device such as a semiconductor memory, an interface for an external device, and so on. The storage device stores programs to be executed by the processor, data to be used in processing by the processor, and so on. Each of the ECUs may include a plurality of processors storage devices, interfaces, and so on. The configuration of the control apparatus in FIG. 1 may be a computer that carries out the present invention that relates to a program.

Functions or the like assigned to the respective ECUs 20 to 29 will be described below. Note that the number of ECUs and functions assigned thereto can be designed as appropriate, and can be further segmented than in the present embodiment, or can be integrated.

The ECU 20 executes control associated with automated driving of the vehicle 1. During automated driving, the ECU 20 automatically controls at least either steering or acceleration/deceleration of the vehicle 1. In a later-described control example, the ECU 20 automatically controls both steering and acceleration/deceleration.

The ECU 21 controls an electric power steering device 3. The electric power steering device 3 includes a mechanism for steering front wheels in accordance with a driver's driving operation (steering operation) to a steering wheel 31. The electric power steering device 3 also includes a motor that exerts a driving force for assisting in the steering operation or automatically steering the front wheels, a sensor for detecting a steering angle, and so on. If the driving state of the vehicle 1 is automated driving, the ECU 21 automatically controls the electric power steering device 3 in response to an instruction from the ECU 20, and controls the traveling direction of the vehicle 1.

The ECUs 22 and 23 control detection units 41 to 43 for detecting the surrounding situation of the vehicle and perform information processing on their detection results. The detection units 41 are cameras (hereinafter referred to as "cameras 41" in some cases) for capturing images of the front of the vehicle 1. In the present embodiment, the detection units 41 are attached to the vehicle interior on the inner side of the windscreen, at a front portion of the roof of the vehicle 1. Analysis of the images captured by the cameras 41 makes it possible to extract an outline of a target and extract a lane marker (white line etc.) of a traffic lane on a road.

The detection units 42 are Light Detection and Ranging (LIDARs), and detect a target around the vehicle 1 and measure the distance to the target. In the present embodiment, five detection units 42 are provided, one on each corner of the front part of the vehicle 1, one at the center of the rear part, and one on each side of the rear part. The detection units 43 are millimeter wave radars (hereinafter referred to as "radars 43" in some cases), and detect a target around the vehicle 1 and measure the distance to the target. In the present embodiment, five radars 43 are provided, one at the center of the front part of the vehicle 1, one at each corner of the front part, and one on each corner of the rear part.

The ECU 22 controls one of the cameras 41 and the detection units 42 and performs information processing on their detection results. The ECU 23 controls the other camera 41 and the radars 43 and performs information processing on their detection results. As a result of two sets of devices for detecting the surrounding situation of the vehicle being provided, the reliability of the detection results can be improved. Also, as a result of different types of detection units such as cameras and radars being provided, manifold analysis of the surrounding environment of the vehicle is enabled.

The ECU 24 controls a gyroscope sensor 5, a GPS sensor 24b, and a communication device 24c, and performs information processing on their detection results or communication results. The gyroscope sensor 5 detects rotational motion of the vehicle 1. A path of the vehicle 1 can be determined based on the results of detection by the gyroscope sensor 5, the wheel speed, or the like. The GPS sensor 24b detects the current position of the vehicle 1. The communication device 24c wirelessly communicates with a server that provides map information, traffic information, and weather information, and acquires such information. The ECU 24 can access a database 24a of map information that is built in the storage device, and the ECU 24 searches for a route from the current location to a destination, for example. Note that a database of the aforementioned traffic information, weather information, or the like may also be built in the database 24a.

The ECU 25 includes a communication device 25a for vehicle-to-vehicle communication. The communication device 25a wirelessly communicates with other vehicles in the surrounding area and exchanges information between the vehicles.

The ECU 26 controls a power plant 6. The power plant 6 is a mechanism that outputs a driving force for rotating drive wheels of the vehicle 1, and includes, for example, an engine and a transmission. For example, the ECU 26 controls the output of the engine in response to the driver's driving operation (acceleration pedal operation or accelerating operation) detected by an operation detection sensor 7a provided on an acceleration pedal 7A, and switches the gear ratio of the transmission based on information such as vehicle speed detected by a vehicle speed sensor 7c. If the driving state of the vehicle 1 is automated driving, the ECU 26 automatically controls the power plant 6 in response to an instruction from the ECU 20 and controls acceleration/deceleration of the vehicle 1.

The ECU 27 controls lighting devices (headlight, tail light etc.) including direction indicators 8 (blinkers). In the example in FIG. 1, the direction indicators 8 are provided at front portions, door mirrors, and rear portions of the vehicle 1.

The ECU 28 controls an input/output device 9. The input/output device 9 outputs information to the driver and accepts input of information from the driver. A sound output device 91 notifies the driver of information using a sound. A display device 92 notifies the driver of information by means of a display of an image. The display device 92 is, for example, disposed in front of the driver seat and constitutes an instrument panel or the like. Note that although an example of using a sound and a display is described here, information may alternatively be notified using a vibration and/or light. Further, information may be notified by combining two or more of a sound, a display, a vibration, and light. Furthermore, the combination may be varied or the notification mode may be varied in accordance with the level (e.g., degree of urgency) of information to be notified. The display device 92 includes a navigation device.

An input device 93 is a switch group that is disposed at a position at which it can be operated by the driver and gives instructions to the vehicle 1, and may also include a sound input device.

The ECU 29 controls brake devices 10 and a parking brake (not shown). The brake devices 10 are, for example, disc brake devices and provided on the respective wheels of the vehicle 1, and decelerate or stop the vehicle 1 by applying resistance to the rotation of the wheels. For example, the ECU 29 controls operations of the brake devices 10 in response to the driver's driving operation (braking operation) of the driver detected by an operation detection sensor 7b provided on a brake pedal 7B. If the driving state of the vehicle 1 is automated driving, the ECU 29 automatically controls the brake devices 10 in response to an instruction from the ECU 20 and controls deceleration and stop of the vehicle 1. The brake devices 10 and the parking brake can also be operated to maintain the stopped state of the vehicle 1. If the transmission of the power plant 6 includes a parking lock mechanism, it can also be operated to maintain the stopped state of the vehicle 1.

A description will be given of control associated with automated driving of the vehicle 1 executed by the ECU 20. If an instruction of a destination and automated driving is given by the driver, the ECU 20 automatically controls the travel of the vehicle 1 to a destination in accordance with a guided route searched for by the ECU 24. During automated control, the ECU 20 acquires information (external information) associated with the surrounding situation of the vehicle 1 from the ECUs 22 and 23, and gives instructions to the ECUs 21, 26, and 29 based on the acquired information to control steering and acceleration/deceleration of the vehicle 1.

Figure 2:
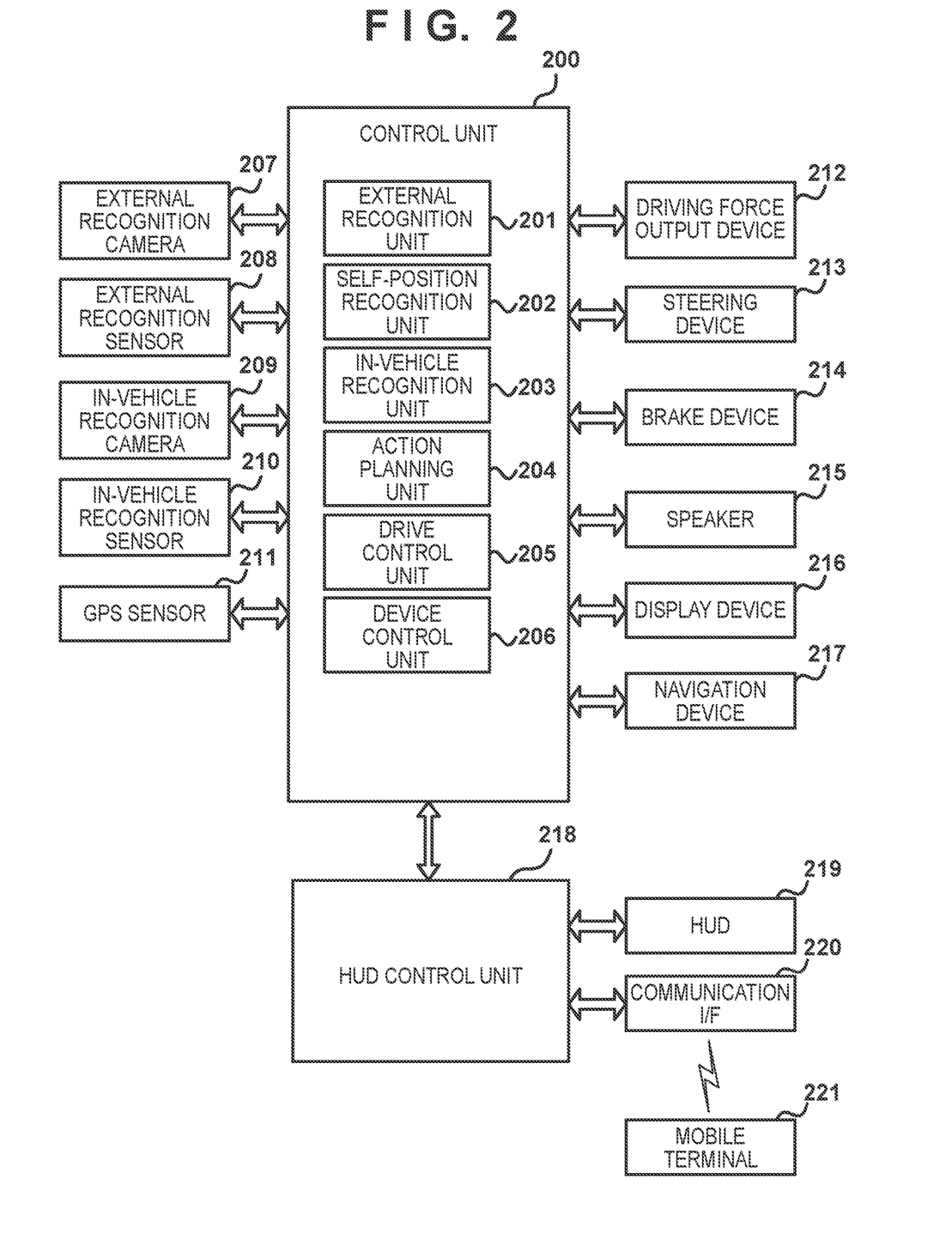
FIG. 2 is a diagram showing functional blocks of a control unit.

FIG. 2 is a diagram showing functional blocks of the control unit 2. A control unit 200 corresponds to the control unit 2 in FIG. 1, and includes an external recognition unit 201, a self-position recognition unit 202, an in-vehicle recognition unit 203, an action planning unit 204, a drive control unit 205, and a device control unit 206. Each block is realized by one or more of the ECUs shown in FIG. 1.

The external recognition unit 201 recognizes external information regarding the vehicle 1 based on signals from external recognition cameras 207 and external recognition sensors 208. Here, the external recognition cameras 207 are, for example, the cameras 41 in FIG. 1, and the external recognition sensors 208 are, for example, the detection units 42 and 43 in FIG. 1. The external recognition unit 201 recognizes, for example, a scene of an intersection, a railroad crossing, a tunnel, or the like, a free space such as a road shoulder, and behavior (speed, traveling direction) of other vehicles, based on signals from the external recognition cameras 207 and the external recognition sensors 208. The self-position recognition unit 202 recognizes the current position of the vehicle 1 based on a signal from the GPS sensor 211. Here, the GPS sensor 211 corresponds to the GPS sensor 24b in FIG. 1, for example.

The in-vehicle recognition unit 203 identifies an occupant of the vehicle 1 and recognizes the state of the occupant based on signals from an in-vehicle recognition camera 209 and an in-vehicle recognition sensor 210. The in-vehicle recognition camera 209 is, for example, an infrared camera installed on the display device 92 inside the vehicle 1, and detects a line-of-sight direction of the occupant, for example. The in-vehicle recognition sensor 210 is, for example, a sensor for detecting a biological signal of the occupant. The in-vehicle recognition unit 203 recognizes that the occupant is in a dozing state or a state of doing work other than driving, based on those signals.

The action planning unit 204 plans actions of the vehicle 1, such as an optimal path and a risk-avoiding path, based on the results of recognition by the external recognition unit 201 and the self-position recognition unit 202. The action planning unit 204 plans actions based on an entrance determination based on a start point and an end point of an intersection, a railroad crossing, or the like, and prediction of behavior of other vehicles, for example. The drive control unit 205 controls a driving force output device 212, a steering device 213, and a brake device 214 based on an action plan made by the action planning unit 204. Here, for example, the driving force output device 212 corresponds to the power plant 6 in FIG. 1, the steering device 213 corresponds to the electric power steering device 3 in FIG. 1, and the brake device 214 corresponds to the brake device 10.

The device control unit 206 controls devices connected to the control unit 200. For example, the device control unit 206 controls a speaker 215 to cause the speaker 215 to output a predetermined sound message, such as a message for warning or navigation. Also, for example, the device control unit 206 controls a display device 216 to cause the display device 216 to display a predetermined interface screen. The display device 216 corresponds to the display device 92, for example. Also, for example, the device control unit 206 controls a navigation device 217 to acquire setting information in the navigation device 217.

The control unit 200 may also include functional blocks other than those shown in FIG. 2 as appropriate, and may also include, for example, an optimal path calculation unit for calculating an optimal path to the destination based on the map information acquired via the communication device 24c. Also, the control unit 200 may also acquire information from anything other than the cameras and sensors shown in FIG. 2, and may acquire, for example, information regarding other vehicles via the communication device 25a. Also, the control unit 200 receives detection signals from various sensors provided in the vehicle 1, as well as the GPS sensor 211. For example, the control unit 200 receives detection signals from a door opening/closing sensor and a mechanism sensor on a door lock that are provided in a door portion of the vehicle 1, via an ECU configured in the door portion. Thus, the control unit 200 can detect unlocking of the door and a door opening/closing operation.

A head-up display (HUD) control unit 218 controls a head-up display (HUD) 219 that is attached to the vehicle interior near the windscreen of the vehicle 1. The HUD control unit 218 and the control unit 200 can communicate with each other, and the HUD control unit 218 acquires, for example, captured image data obtained by the external recognition cameras 207 via the control unit 200. The HUD 219 projects an image onto the windscreen under the control of the HUD control unit 218. For example, the HUD control unit 218 receives captured image data obtained by the external recognition cameras 207 from the control unit 200, and generates image data to be projected by the HUD 219 based on the captured image data. This image data is, for example, image data to be overlapped (superimposed) with the landscape that can be seen from the driver through the windscreen. Due to the projection onto the windscreen by the HUD 219, the driver can feel that an icon image (destination information etc.) for navigation is overlapped with the landscape of a road ahead, for example. The HUD control unit 218 can communicate with an external device via a communication interface (I/F) 220. The external device is, for example, a mobile terminal 221 such as a smartphone held by the driver. The communication I/F 220 may be configured such that it can be connected to a plurality of networks, and may be, for example, configured such that it can be connected to the Internet.

Figure 3:
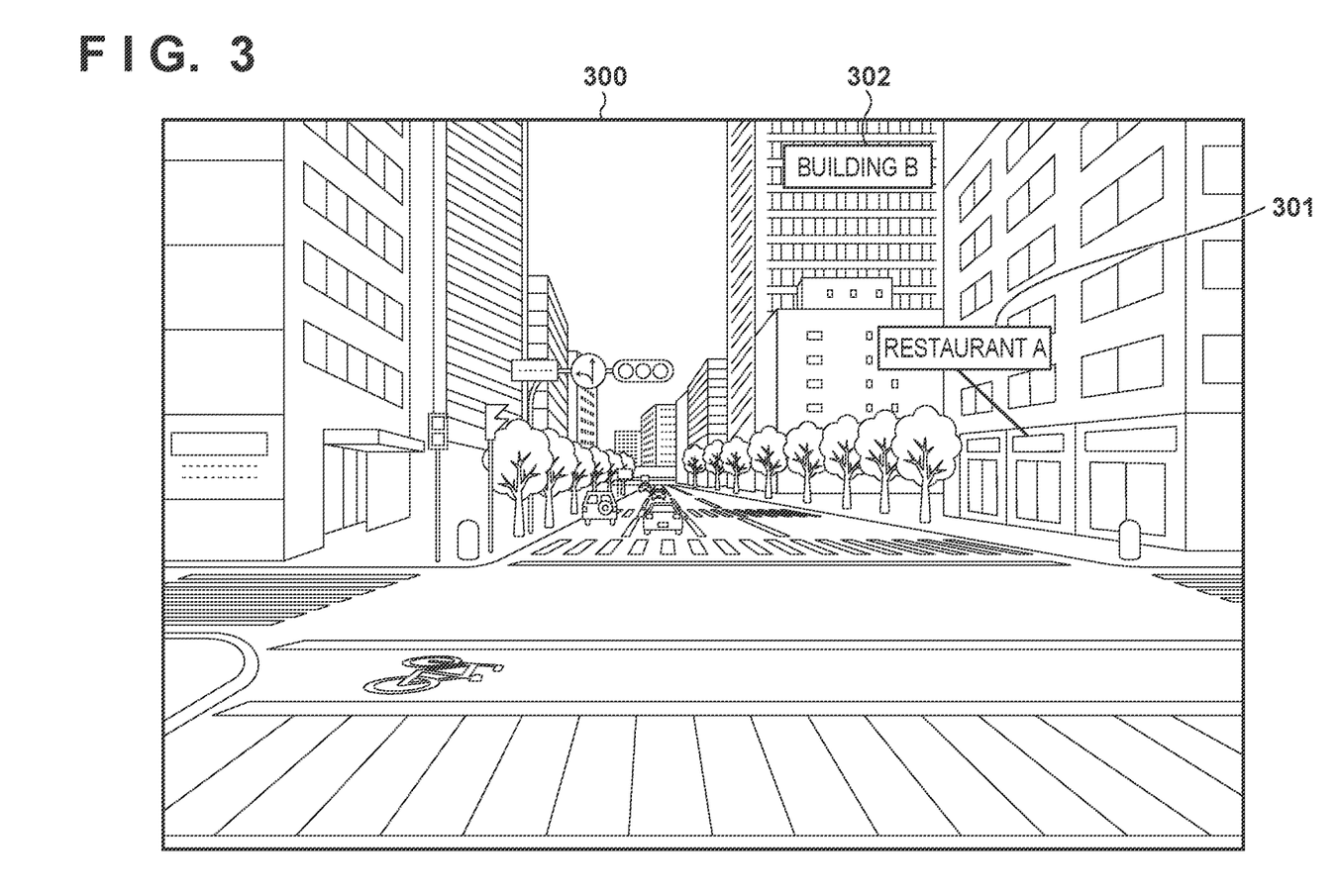
FIG. 3 is a diagram showing a visual field region seen from a driver.

Operations in the present embodiment will be described below. FIG. 3 is a diagram for illustrating operations in the present embodiment. FIG. 3 shows a visual field region that can be visually recognized by the driver through the windscreen. In a visual field region 300 in FIG. 3, information 301 and 302 indicates information corresponding to areas at which the driver has placed a viewpoint on the windscreen for a fixed time. For example, the information 301 indicates that the first floor of a building on the right side at which the driver has placed a viewpoint for a fixed time is a "restaurant A". The information 302 indicates that a building in front at which the driver has placed a viewpoint for a fixed time is a "building B". In general, drivers tend to place a viewpoint at a point of interest (POI) for a fixed point. That is to say, information corresponding to a point of interest (POI) of the driver is displayed on the windscreen by the HUD 219.

It is desirable for the driver that information regarding a point of interest is displayed, but there may be a situation where the driver has to move the viewpoint away from that point depending on the driving situation. In the present embodiment, information regarding a point of interest is appropriately presented based on two methods, namely HUD display on the windscreen by the HUD 219 and transmission of the information to the driver's mobile terminal 221.

In the present embodiment, if it is detected that the driver has placed a viewpoint at a point for a predetermined time or more, HUD display is executed, and information is transmitted to the mobile terminal 221 held by the driver. With this configuration, information regarding a point of interest can be displayed for the driver during driving, and the driver can also check the information after the driving.

Figure 5:
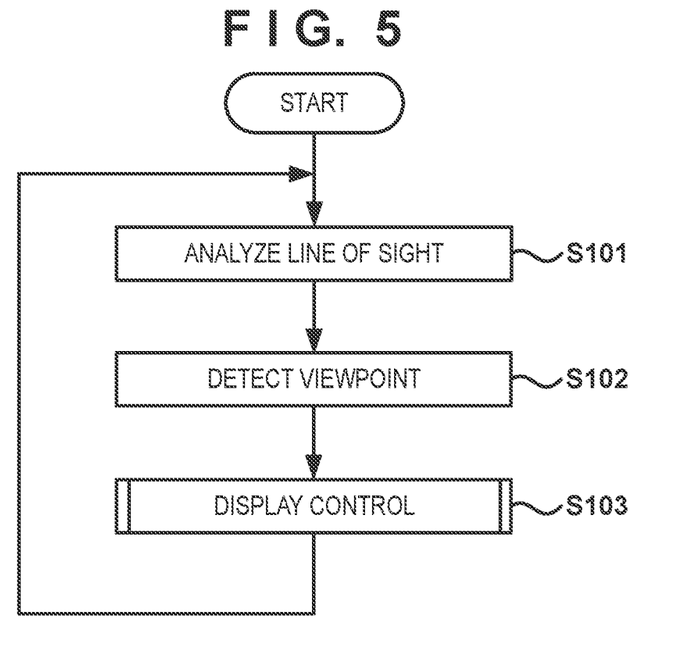
FIG. 5 is a flowchart showing display control processing.

FIG. 5 is a flowchart showing display control processing in the present embodiment. For example, the processing in FIG. 5 is realized by the HUD control unit 218 loading a program from a storage area of a ROM or the like and executing the program. The processing in FIG. 5 is started upon the vehicle 1 starting traveling.

In step S101, the HUD control unit 218 analyzes the driver's line of sight. For example, the in-vehicle recognition unit 203 of the control unit 200 may analyze the driver's line of sight using the in-vehicle recognition camera 209 and an in-vehicle recognition sensor 210, and the HUD control unit 218 may acquire the analysis results.

In step S102, the HUD control unit 218 detects the driver's viewpoint on the windscreen. That is to say, the HUD control unit 218 specifies the coordinates of the viewpoint in the visual field region 300 based on the analysis results obtained in step S101. For example, the HUD control unit 218 specifies the coordinates of the viewpoint in the visual field region 300 to be subjected to HUD display, based on captured image data that corresponds to the visual field region 300 and is obtained by the external recognition camera 207. For example, the HUD control unit 218 may detect a viewpoint based on an overlap of viewpoints on AR content displayed in the visual field region 300. Here, an overlap of viewpoints may be determined based on an area around the center of the AR content, or may be determined based on a predetermined region including the surroundings of the AR content. The predetermined region may be determined in accordance with the number of pieces of other displayed AR content or the details thereof.

In step S103, the HUD control unit 218 performs later-described display control. After step S103, processing from step S101 is repeated.

Figure 6:
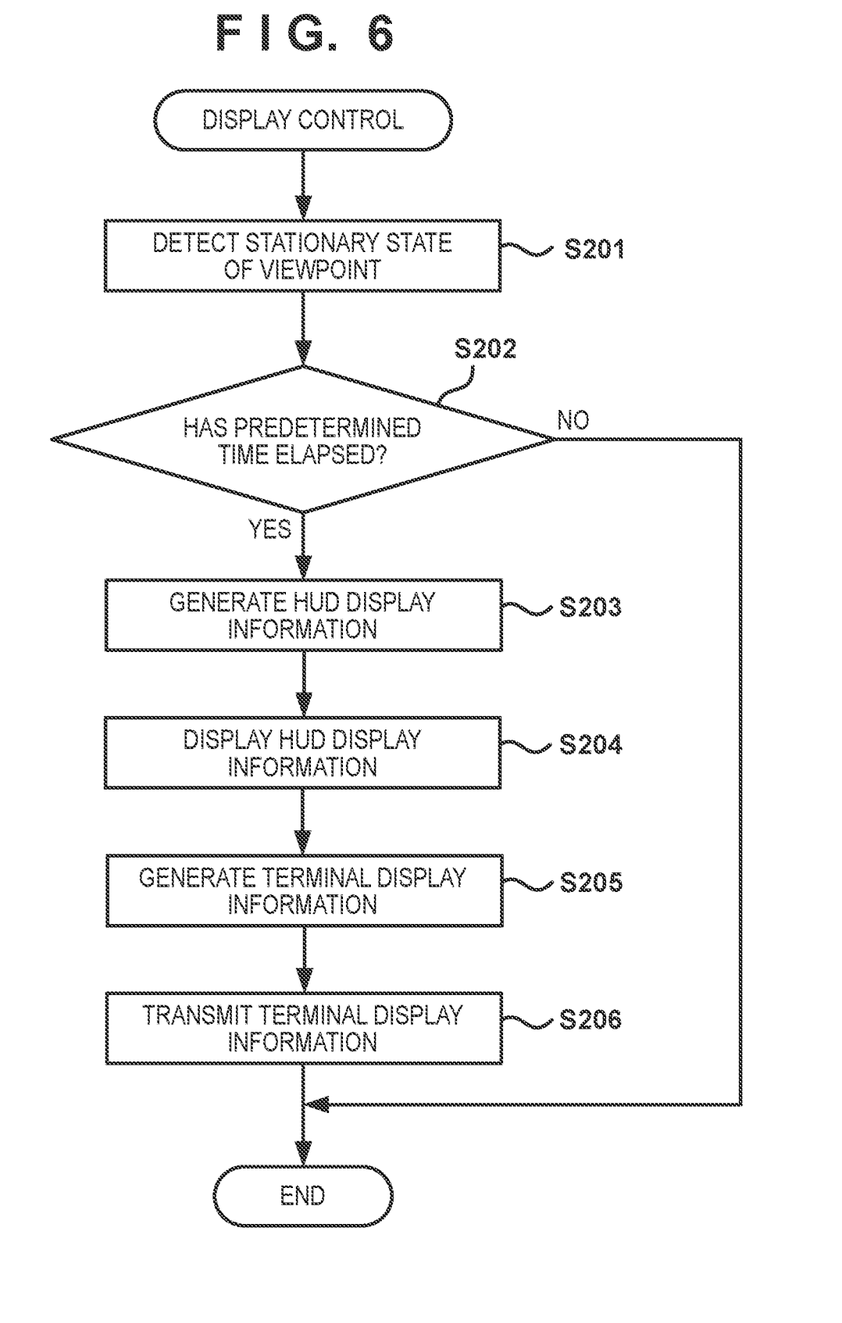
FIG. 6 is a flowchart showing display control processing.

FIG. 6 is a flowchart showing the display control processing in step S103. In step S201, the HUD control unit 218 detects a stationary state of the viewpoint based on the coordinates of the viewpoint specified in step S102. For example, upon detecting that the viewpoint has not moved from a predetermined space for a predetermined unit time with which the viewpoint is considered to be stationary, the HUD control unit 218 starts measuring the time for which the viewpoint is stationary, using a timer function.

In step S202, the HUD control unit 218 determines whether or not a predetermined time has elapsed. Here, if it is determined that the predetermined time has not elapsed, it is decided that the position of the viewpoint is not a point of interest of the driver, and the processing in FIG. 6 ends. On the other hand, if it is determined that the predetermined time has elapsed, it is decided that the position of the viewpoint is a point of interest of the driver, and the processing proceeds to step S203.

In step S203, the HUD control unit 218 generates information (HUD display information) to be displayed on the windscreen by the HUD 219. For example, the HUD control unit 218 extracts information corresponding to the point of interest, based on the current position of the vehicle 1 and the map information acquired from the control unit 200, and object information corresponding to the position of the viewpoint on the captured image data. The HUD display information is, for example, a name such as that indicated as the information 301 or the information 302 in FIG. 3.

The content of the HUD display information is not limited to a name, but any other information may also be added thereto. For example, the content of the HUD display information is not limited to name information obtained from the map information, and related information that may be acquired from the Internet may also be added. For example, the HUD control unit 218 may acquire related information from the Internet based on a name. At this time, for example, in the case of the name of a restaurant such as the information 301, information such as business hours, SNS information, a genre such as Japanese food or Western food, and evaluation of this restaurant may be acquired and displayed together with the name. Also, the HUD control unit 218 may newly generate related information based on the information acquired from the Internet. For example, information indicating whether the restaurant is open or closed may be generated as related information based on the business hours acquired from the Internet and information on the current date and time information. The related information may also be generated based on the external recognition results obtained by the external recognition unit 201. For example, congestion information or the like may be generated as related information based on the image recognition results, such as an image showing that there is a waiting line of people in front of a restaurant corresponding to the information 301.

The amount of related information may be changeable. For example, if it is inferred that the driver is more interested based on the driver's preference information, the related information may be increased. The driver's preference may be analyzed in advance by an external server by pairing the driver's mobile terminal 221 with the vehicle 1 (control unit 200), for example. For example, the server analyzes and acquires the driver's eating and drinking preference based on search history information on the Internet of the mobile terminal 221 or the like. Also, a configuration may be employed in which each configuration of the above-described HUD display information can be set through user settings.

In step S204, the HUD control unit 218 displays the HUD display information generated in step S203 based on the coordinates of the viewpoint of which a stationary state is detected in step S201. For example, the HUD control unit 218 executes HUD display so as not to overlap with a travel path in the visual field region 300 via a lead line from the coordinates of the viewpoint of which a stationary state is detected in step S201.

Figure 4:
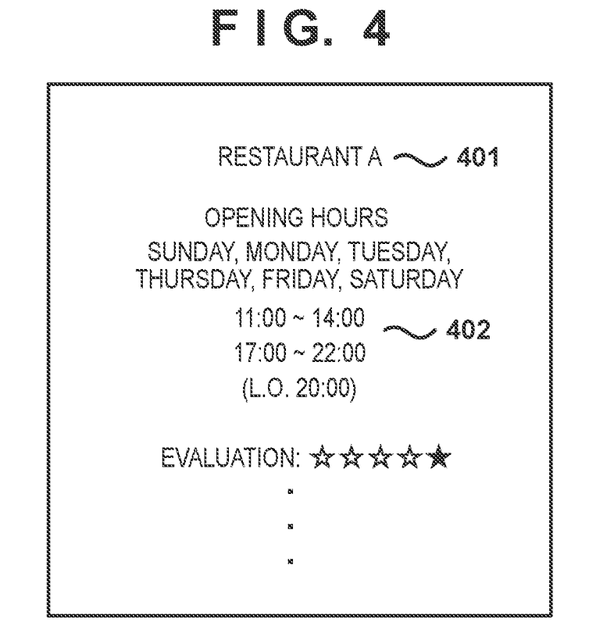
FIG. 4 is a diagram showing information displayed on a mobile terminal.

In step S205, the HUD control unit 218 generates information (terminal display information) to be displayed on the mobile terminal 221 held by the driver. The terminal display information may be the same information as, or may differ from, the HUD display information generated in step S203. For example, the terminal display information may be information related to the HUD display information generated in step S203. FIG. 4 is a diagram showing an example of the terminal display information generated in step S205. As shown in FIG. 4, information 401 corresponding to "restaurant A", which is the information 301, and information 402 related to the information 301 are generated as the terminal display information.

The terminal display information may also include the following information that is less relevant to the content of the HUD display information. For example, information regarding the time for which the area of the HUD display information was stared at may be included. Position information regarding the vehicle 1 and navigation information at the time when the area of the HUD display information was stared at may also be included. For example, a destination and a goal of the vehicle 1 and path information may be included as navigation information. Weather information and time information may also be included. As a result of the terminal display information thus including the aforementioned information, the driver can readily recall at which point the driver saw the information, based on the information displayed on the mobile terminal 221 after driving.

The terminal display information may also be generated as information that is simplified HUD display information. For example, if it is inferred that the driver is not interested, as a result of analyzing a face image and a voice of the driver after the HUD display information has been displayed in step S204, the terminal display information may be generated as simplified HUD display information, e.g., a name only. The results of analyzing a face image and a voice of the driver may be obtained by acquiring the recognition results obtained by the in-vehicle recognition unit 203. Furthermore, a configuration may be employed in which the terminal display information is not generated depending on the results of analyzing a face image and a voice of the driver after the HUD display information has been displayed in step S204.

In step S206, the HUD control unit 218 transmits the terminal display information generated in step S205 to the mobile terminal 221 held by the driver. For example, the terminal display information may be transmitted by e-mail. Here, along with the transmission of the terminal display information, a sound notification indicating that the information has been transmitted may be given to the driver. The sound notification may be given by the speaker 215, or may be given by the mobile terminal 221. After step S206, the processing in FIG. 6 ends.

Thus, according to the present embodiment, if an area at which the driver places a viewpoint for a predetermined time or more is detected, HUD display is executed, and information is transmitted to the mobile terminal 221 held by the driver. With this configuration, information regarding a point of interest can be displayed for the driver during driving, and the driver can also check the information after the driving.

Although the present embodiment has described that the mobile terminal 221 is a mobile terminal held by the driver, it may alternatively be a mobile terminal held by a passenger other than the driver, e.g., a person in a passenger seat or a back seat. Also, the mobile terminal 221 need not be present in the vehicle 1. That is to say, a PC or the like that is outside the vehicle 1, e.g., that is present in the driver's house may be used as the mobile terminal 221 in the present embodiment due to being paired with the vehicle 1 (control unit 200). Also, a device mounted in the vehicle 1 may be used as the mobile terminal 221. For example, a display audio device or a meter display mounted in the vehicle 1 may be used as the mobile terminal 221.

Although the present embodiment has described a configuration in which the driver's line of sight is analyzed and the terminal display information is transmitted to the driver's mobile terminal 221, the person whose line of sight is to be analyzed is not limited to the driver, and a configuration may alternatively be employed in which a line of sight of a passenger other than the driver, such as a person in a passenger seat or a back seat, is analyzed, and information is transmitted to a corresponding (paired) mobile terminal. At this time, the terminal display information may be transmitted to any of the aforementioned various devices, rather than the mobile terminal.

Although the present embodiment has described that whether or not a predetermined time has elapsed is determined in step S202 after a stationary state of a viewpoint has been detected in step S201, this predetermined time may be changeable. For example, if the current time information is 11:00 to 14:00, it is inferred that the driver is having lunch, and therefore the predetermined time is set shorter than that in other time periods. With this configuration, while the driver is moving the viewpoint over a plurality of points to search for a restaurant, HUD display can be readily executed at a point at which the driver stops the viewpoint with interest. Also, for example, the predetermined time may be changeable based on the driver's preference. For example, upon a stationary state of the viewpoint being detected in step S201, information corresponding to the point of interest, as mentioned above. If it is inferred that that information matches the driver's preference; for example, if there is a signboard of "ABC golf" and it has been analyzed that the driver likes golf, the predetermined time is set shorter.

Whether or not to execute the operations in the present embodiment may be set in accordance with a control state of the vehicle 1. For example, the operations in the present embodiment may be executed in the case of an eyes-off automated driving mode.

Second Embodiment

The second embodiment will be described below regarding differences from the first embodiment. In the present embodiment, HUD display is executed if it is detected that the driver places a viewpoint at a point for a predetermined time or more. On the other hand, if the time for which the driver places the viewpoint at a point is less than the predetermined time, information is transmitted to the mobile terminal 221 held by the driver. With this configuration, if, for example, the driver moves the viewpoint away from a point in a short time, the driver can check the information after driving.

Figure 7:
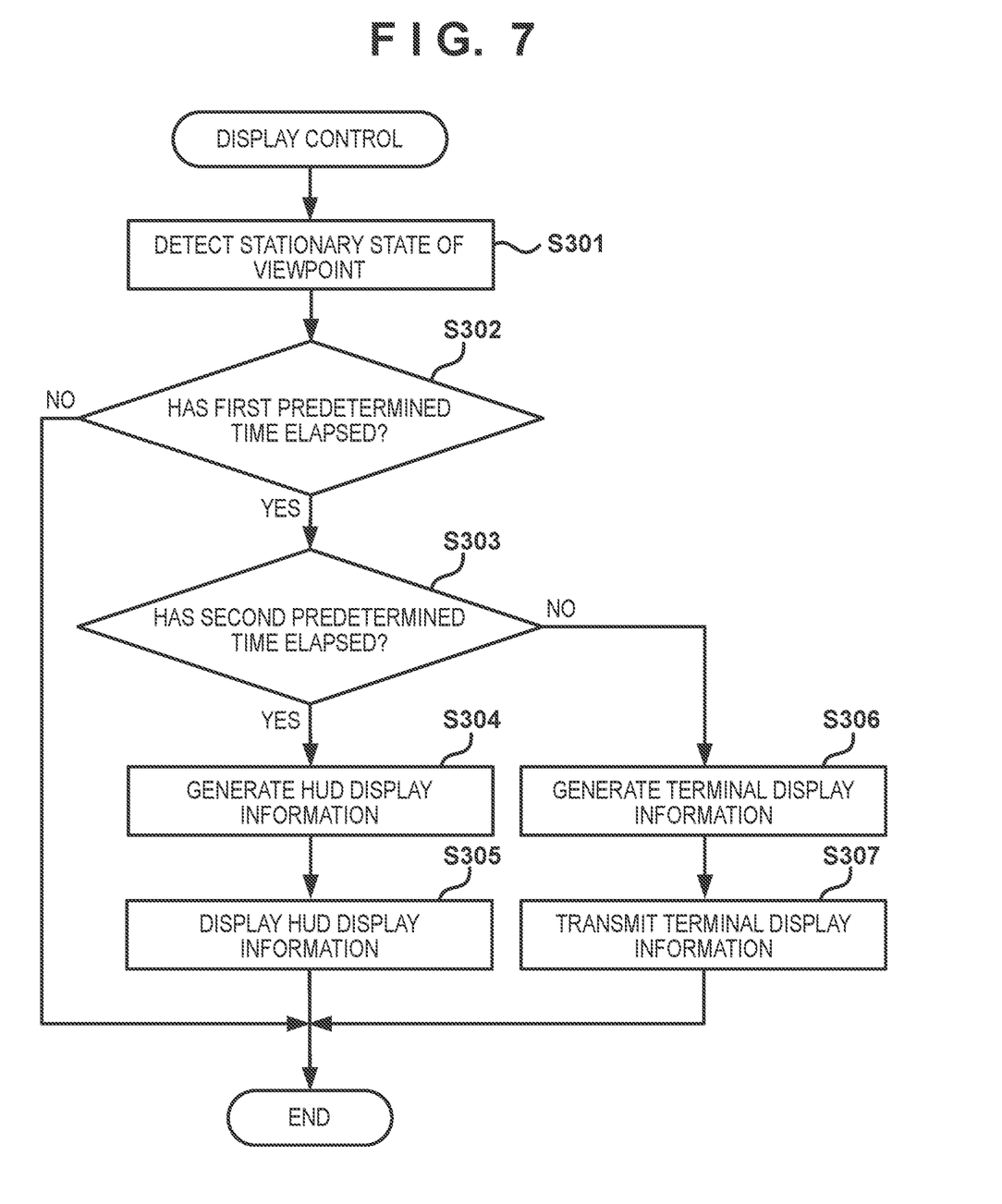
FIG. 7 is a flowchart showing display control processing.

FIG. 7 is a flowchart showing another display control processing in step S103. Step S301 is the same processing as S201, and a description thereof is omitted. After step S301, in step S302, the HUD control unit 218 determines whether or not a first predetermined time has elapsed. Here, if it is determined that the first predetermined time has not elapsed, it is decided that the position of this viewpoint is not a point of interest of the driver, and the processing in FIG.

7 ends. On the other hand, if it is determined that the first predetermined time has elapsed, it is decided that the position of this viewpoint is a point of interest of the driver, and the processing proceeds to step S303.

In step S303, the HUD control unit 218 determines whether or not a second predetermined time has elapsed. Note that the second predetermined time is set longer than the first predetermined time. If it is determined that the second predetermined time has elapsed, in step S304, the HUD control unit 218 generates HUD display information, and in step S305, the generated HUD display information is displayed based on the coordinates of the viewpoint of which a stationary state is detected in step S301. Thereafter, the processing in FIG. 7 ends.

If it is determined in step S303 that the second predetermined time has not elapsed, in step S306, the HUD control unit 218 generates terminal display information. The terminal display information may be the same as, or may differ from, the HUD display information generated in step S304. For example, the terminal display information may be information related to the HUD display information generated in step S304. In step S307, the HUD control unit 218 transmits the terminal display information generated in step S306 to the mobile terminal 221 held by the driver. For example, the terminal display information may be transmitted by e-mail. Here, along with the transmission of the terminal display information, a sound notification indicating that the information has been transmitted may be given to the driver. The sound notification may be given by the speaker 215, or may be given by the mobile terminal 221. After step S307, the processing in FIG. 7 ends.

Thus, according to the present embodiment, if an area at which the driver places a viewpoint for a predetermined time or more is detected, HUD display is executed. On the other hand, if the time for which the driver places the viewpoint to that area is less than the predetermined time, HUD display is not executed, and information is transmitted to the mobile terminal 221 held by the driver. Also, as described as the first predetermined time, as for an area at which the driver does not place a viewpoint for a fixed time, it is decided that the driver is not interested in this area, and the HUD display information and the terminal display information are not generated. With this configuration, if, for example, it can be decided that the driver is interested in an area but the driver moves the viewpoint away therefrom in a short time, the driver can check information regarding the area after driving.

Third Embodiment

The third embodiment will be described regarding differences from the first and second embodiments. In the present embodiment, even if the time for which the viewpoint is placed at a point is less than a predetermined time, if there is a specific reason, information is transmitted to the mobile terminal 221 held by the driver. If there is no specific reason, information is not transmitted to the mobile terminal 221. With this configuration, in a situation where the viewpoint needs to be necessarily moved away, e.g., for the purpose of risk avoidance during driving, information is transmitted to the mobile terminal 221. With this configuration, the driver can check that information after driving.

Figure 8:
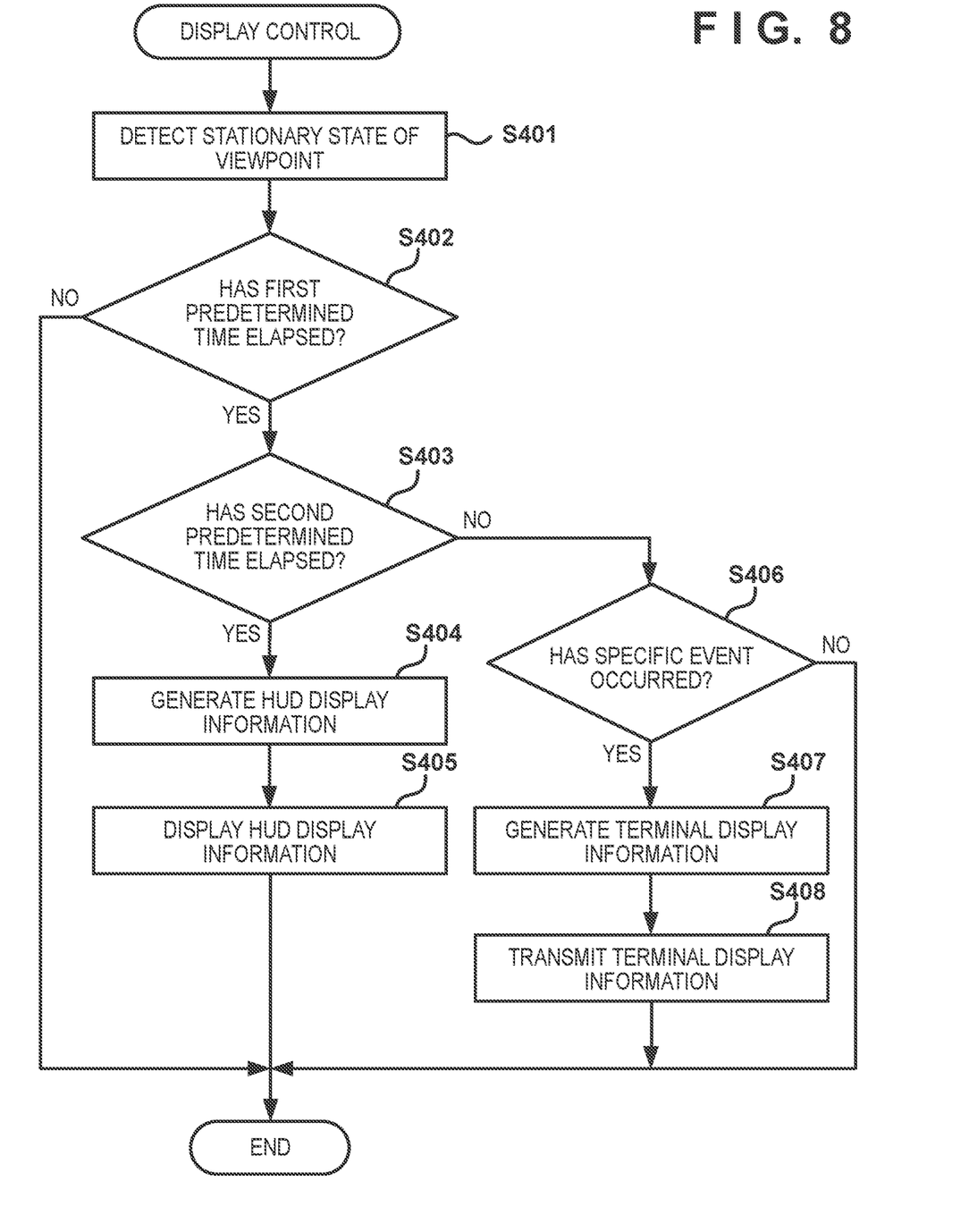
FIG. 8 is a flowchart showing display control processing.

FIG. 8 is a flowchart showing another display control processing in step S103. Step S401 is the same processing as S201, and a description thereof is omitted accordingly. After step S401, in step S402, the HUD control unit 218 determines whether or not a first predetermined has elapsed.

Here, if it is determined that the first predetermined time has not elapsed, it is decided that the position of this viewpoint is not a point of interest of the driver, and the processing in FIG. 8 ends. On the other hand, if it is determined that the first predetermined time has elapsed, it is decided that the position of this viewpoint is a point of interest of the driver, and the processing proceeds to step S403.

In step S403, the HUD control unit 218 determines whether or not a second predetermined time has elapsed. Note that the second predetermined time is set longer than the first predetermined time. If it is determined that the second predetermined time has elapsed, in step S404, the HUD control unit 218 generates HUD display information, and in step S405, the generated HUD display information is displayed based on the coordinates of the viewpoint of which a stationary state is detected in step S401. Thereafter, the processing in FIG. 8 ends.

If it is determined in step S403 that the second predetermined time has not elapsed, in step S406, the HUD control unit 218 determines whether or not a specific event has occurred before the second predetermined time elapses. For example, it is determined whether or not there has been, as a specific event, a sudden change in the behavior of the vehicle 1 (sudden acceleration, sudden deceleration etc.), a change in the amount of steering, or a hand-off warning notification. If it is determined that any of these events has occurred, it is decided that the driver has necessarily moved the viewpoint away from the point of interest, and the processing proceeds to step S407. On the other hand, if it is determined that no specific event has occurred, it is decided that information corresponding to the position of this viewpoint is not information that the driver is to check with the mobile terminal 221 after driving, and the processing in FIG. 8 ends.

Note that, in step S406, processing other than determination of whether or not a specific event has occurred may be performed. For example, a reason that the driver has moved the viewpoint away may be inferred based on the behavior of the vehicle 1, the recognition results obtained by the external recognition unit 201, the map information, or the like. For example, when another vehicle or a moving object is approaching, or a near-miss point is recognized, it may be decided that the driver has moved the viewpoint away due to risk avoidance during driving, and the processing may proceed to S407. Also, if the recognition results obtained by the in-vehicle recognition unit 203, e.g., a state of the driver himself (an operation of a meter, a predetermined gesture etc.) is detected, the processing may proceed to step S407.

In step S407, the HUD control unit 218 generates terminal display information. The terminal display information may be the same as, or may differ from, the HUD display information generated in step S404. For example, the terminal display information may be information related to the HUD display information generated in step S404. In step S408, the HUD control unit 218 transmits the terminal display information generated in step S407 to the mobile terminal 221 held by the driver. For example, the terminal display information may be transmitted by e-mail. Here, along with the transmission of the terminal display information, a sound notification indicating that the information has been transmitted may be given to the driver. The sound notification may be given by the speaker 215, or may be given by the mobile terminal 221. After step S408, the processing in FIG. 8 ends.

Thus, according to the present embodiment, even if the time for which the viewpoint is placed at a point is less than a predetermined time, if there is a specific reason (e.g., a specific event has occurred), information is transmitted to the mobile terminal 221 held by the driver. On the other hand, if there is no specific reason, information is not transmitted to the mobile terminal 221. With this configuration, in a situation where the viewpoint needs to be necessarily moved away, e.g., for the purpose of risk avoidance during driving, information is transmitted to the mobile terminal 221. Thus, the driver can check the information after driving.

Fourth Embodiment

The fourth embodiment will be described below regarding differences from the first to third embodiments. In the present embodiment, if it is detected that the driver has not been able to check the content of the information, in a predetermined time after HUD display was executed and then the display disappeared, information is transmitted to the mobile terminal 221 held by the driver. With this configuration, if it is decided that the driver has not been able to sufficiently check information displayed by the HUD, information is transmitted to the mobile terminal 221 such that the driver can check this information after driving.

Figure 9:
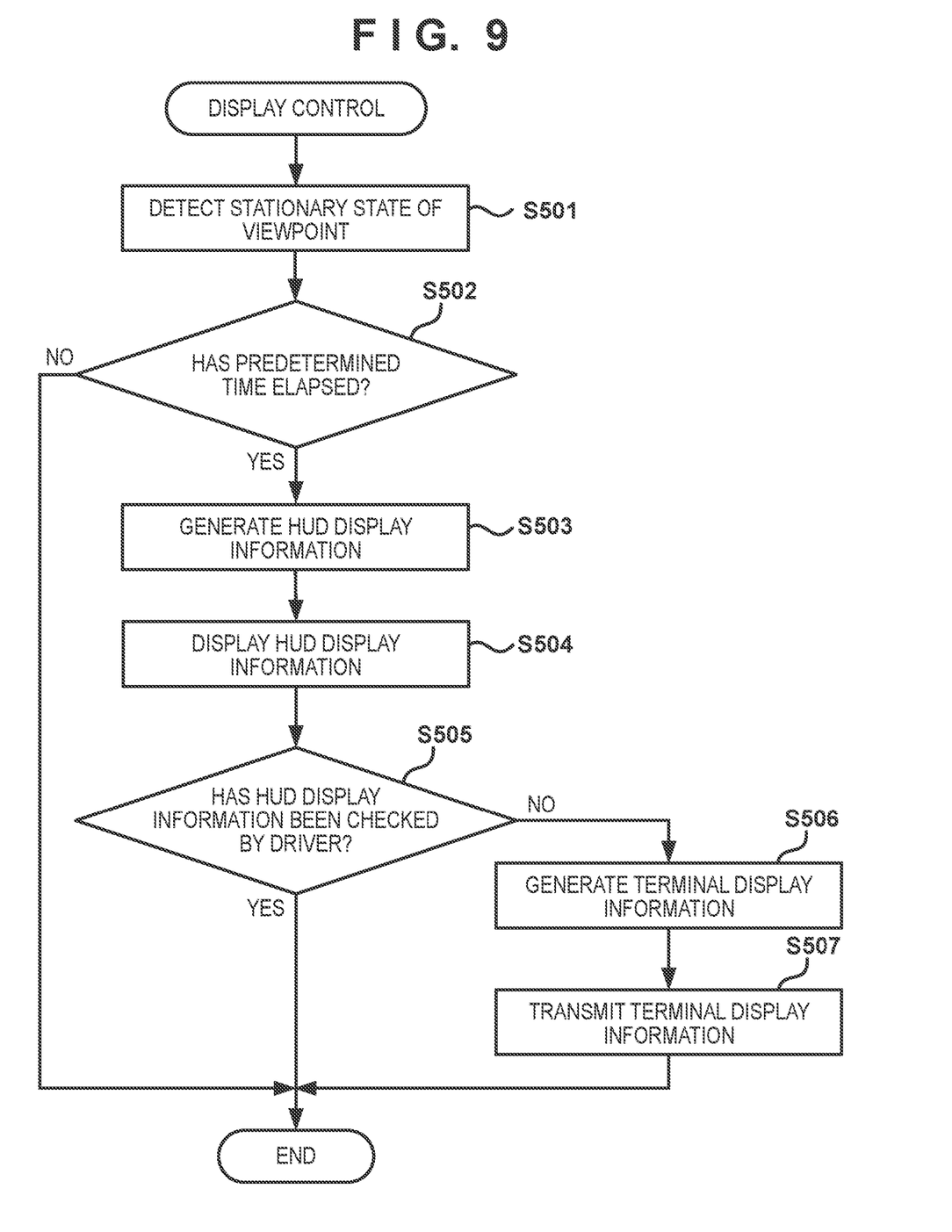
FIG. 9 is a flowchart showing display control processing.

FIG. 9 is a flowchart showing another display control processing in step S103. Step S501 is the same processing as S201, and a description thereof is omitted. After step S501, in step S502, the HUD control unit 218 determines whether or not a predetermined time has elapsed. Here, if it is determined that the predetermined time has not elapsed, it is decided that the position of this viewpoint is not a point of interest of the driver, and the processing in FIG. 9 ends. On the other hand, if it is determined that the predetermined time has elapsed, it is decided that the position of this viewpoint is a point of interest of the driver, and the processing proceeds to step S503.

In step S503, the HUD control unit 218 generates HUD display information, and in step S504, the generated HUD display information is displayed based on the coordinates of the viewpoint of which a stationary state is detected in step S501. Then, upon the HUD display information being displayed, the HUD control unit 218 starts measurement using a timer function.

In step S505, the HUD control unit 218 determines whether or not the HUD display information displayed in step S504 has been checked by the driver. For example, if it is determined that the display has disappeared for some reason before a predetermined time elapses after the HUD display information is displayed in step S504, the HUD control unit 218 determines that the HUD display information has not been checked by the driver. Also, the HUD control unit 218 may perform the determination based on the recognition results obtained by the in-vehicle recognition unit 203. For example, whether or not the information has been checked by the driver may be determined based on the results of analyzing the driver's image and voice. The driver's image is, for example, an image of the driver's gesture. At this time, a gesture (such as shaking the palm) meaning that the driver could not check the information may be predetermined, and the determination may be performed based on whether or not the driver has performed this gesture. Also, the determination may be performed based on whether or not the time for which the driver places the viewpoint at the HUD display information is a predetermined time or more. If it is determined in step S505 that the information has been checked by the driver, the processing in FIG. 9 ends. On the other hand, if it is determined that the information has not been checked by the driver, the processing proceeds to step S506.

In step S506, the HUD control unit 218 generates terminal display information. The terminal display information may be the same as, or may differ from, the HUD display information generated in step S503. For example, the terminal display information may be information related to the HUD display information generated in step S503. In step S507, the HUD control unit 218 transmits the terminal display information generated in step S506 to the mobile terminal 221 held by the driver. For example, the terminal display information may be transmitted by e-mail. Here, along with the transmission of the terminal display information, a sound notification indicating that the information has been transmitted may be given to the driver. The sound notification may be given by the speaker 215, or may be given by the mobile terminal 221. After step S507, the processing in FIG. 9 ends.

Thus, according to the present embodiment, if it is detected that the driver has not been able to checked the content of display in a predetermined time after the HUD display was executed and this display disappeared, information is transmitted to the mobile terminal 221 held by the driver. With this configuration, if it is decided that the driver has not been able to sufficiently check information displayed by the HUD, information is transmitted to the mobile terminal 221 such that the driver can check this information after driving.

Each of the above embodiments may be selected as an operation mode by the driver. In this case, corresponding predetermined time in FIGS. 6 to 9 may be fixed, or may be uniquely fixed in the respective modes.

SUMMARY OF EMBODIMENTS

A display control apparatus of one of the above embodiments includes: a detection unit (209, 210, 203, S102) configured to analyze a line of sight of a driver of a vehicle, and detect a viewpoint of the driver in a visual field region of the driver that is obtained as a result of the analysis; a display control unit (218) configured to display an image such that the image is superimposed on the visual field region, based on a result of the detection by the detection unit; and a transmission control unit (FIG. 6, FIG. 7, FIG. 8, FIG. 9) configured to, if a condition is satisfied, transmit related information that is related to information represented by the image to an external terminal, in addition to or instead of the display control unit displaying the image.

With this configuration, information in which the driver is interested can be presented to the driver using an appropriate presentation method.

As the condition, if the detection unit has detected a stationary state of the viewpoint for a first predetermined time, the transmission control unit transmits the related information to the external terminal in addition to the display control unit displaying the image.

With this configuration, for example, information in which the driver is interested can be displayed by the HUD and also transmitted to the driver's mobile terminal.

As the condition, if the detection unit does not detect a stationary state of the viewpoint for a second predetermined time, the transmission control unit transmits the related information to the external terminal instead of the display control unit displaying the image. If the detection unit has detected the stationary state of the viewpoint for the second predetermined time, the display control unit displays the image, and the transmission control unit does not transmit the related information to the external terminal. The condition is that the detection unit has further detected the stationary state of the viewpoint for a third predetermined time that is shorter than the second predetermined time.

With this configuration, if, for example, the driver cannot sufficiently see the information in which the driver is interested, the information can be transmitted to the driver's mobile terminal such that the driver can check the information after driving.

The display control apparatus further includes a determination unit (S406) configured to determine whether or not a specific event has occurred if the detection unit does not detect the stationary state of the viewpoint for the second predetermined time, wherein if it is determined by the determination unit that the specific event has occurred, the transmission control unit transmits the related information to the external terminal, instead of the display control unit displaying the image.

With this configuration, if, for example, the driver cannot sufficiently see information in which the driver is interested due to unavoidable reasons such as risk avoidance, the information can be transmitted to the driver's mobile terminal such that the driver can check the information after driving.

If it is determined by the determination unit that the specific event has not occurred, the transmission control unit does not transmit the related information to the external terminal.

With this configuration, if, for example, it is decided that the driver is not interested in information, a configuration in which the information is not transmitted to the driver's mobile terminal can be employed.

The display control apparatus further includes a decision unit (S505) configured to decide whether or not the image has been checked by the driver, after the image was displayed by the display control unit, wherein, as the condition, if it is decided by the decision unit that the image has not been checked by the driver, the transmission control unit transmits the related information to the external terminal. If it is decided by the decision unit that the image has been checked by the driver, the transmission control unit does not transmit the related information to the external terminal. The decision unit decides whether or not the image has been checked by the driver, based on whether or not the detection unit has detected the stationary state of the viewpoint for a fourth predetermined time.

With this configuration, if, for example, it is decided that information in which the driver is interested has not been checked by the driver, the information can be transmitted to the driver's mobile terminal such that the driver can check the information after driving.

The external terminal is a mobile terminal held by the driver. With this configuration, for example, information can be transmitted to the driver's mobile terminal.

The invention is not limited to the foregoing embodiments, and various variations/changes are possible within the spirit of the invention.

What is claimed is:

1. A display control apparatus comprising:
   at least one processor circuit with a memory comprising instructions, that when executed by the processor circuit, cause the at least one processor circuit to at least:
   analyze a line of sight of a driver of a vehicle, and detect a viewpoint of the driver in a visual field region of the driver that is obtained as a result of the analysis;
   display an image such that the image is superimposed on the visual field region, based on the result of the analysis and the viewpoint detected; and
   in accordance with a time period for which the line of sight of the driver analyzed is stationary, control transmission of related information that is related to information represented by the image to an external terminal, in addition to or instead of displaying the image
   wherein, if the time period reaches a first predetermined time period, the related information is transmitted to the external terminal in addition to displaying the image.

2. The display control apparatus according to claim 1, wherein, if the time period does not reach a second predetermined time period, the related information is transmitted to the external terminal instead of displaying the image.

3. The display control apparatus according to claim 2, wherein if the time period reaches the second predetermined time period, the image is displayed, and the related information is not transmitted to the external terminal.

4. The display control apparatus according to claim 2, wherein the time period reaches a third predetermined time period that is shorter than the second predetermined time period.

5. The display control apparatus according to claim 2, wherein, when executed, the instructions further causes the processor circuit to
   at least:
   determine whether or not a specific event has occurred if the time period does not reach the second predetermined time period,
   wherein if it is determined that the specific event has occurred, the related information is transmitted to the external terminal, instead of the image being displayed.

6. The display control apparatus according to claim 5, wherein if it is determined that the specific event has not occurred, the related information is not transmitted to the external terminal.

7. The display control apparatus according to claim 1, wherein, when executed, the instructions further causes the processor circuit to at least:
   decide whether or not the image has been checked by the driver, after the image was displayed,
   wherein, if the image has not been checked by the driver, the related information is transmitted to the external terminal.

8. The display control apparatus according to claim 7, wherein if the image has been checked by the driver, the related information is not transmitted to the external terminal.

9. The display control apparatus according to claim 7, wherein deciding whether or not the image has been checked by the driver is based on whether or not the time period reaches a fourth predetermined time.

10. The display control apparatus according to claim 1, wherein the external terminal is a mobile terminal held by the driver.

11. A display control method to be executed by a display control apparatus, the method comprising:
    analyzing a line of sight of a driver of a vehicle, and detecting a viewpoint of the driver in a visual field region of the driver that is obtained as a result of the analysis;

displaying an image such that the image is superimposed on the visual field region, based on a detection result; and in accordance with a time period for which the line of sight of the driver analyzed is stationary, transmitting related information that is related to information represented by the image to an external terminal, in addition to or instead of displaying the image, wherein, if the time period reaches a first predetermined time period, the related information is transmitted to the external terminal in addition to displaying the image.

12. A non-transitory computer-readable storage medium storing a program for causing a computer to perform functions of:

analyzing a line of sight of a driver of a vehicle, and detecting a viewpoint of the driver in a visual field region of the driver that is obtained as a result of the analysis;

displaying an image such that the image is superimposed on the visual field region, based on a detection result; and in accordance with a time period for which the line of sight of the driver analyzed is stationary, transmitting related information that is related to information represented by the image to an external terminal, in addition to or instead of displaying the image, wherein, if the time period reaches a first predetermined time period, the related information is transmitted to the external terminal in addition to displaying the image.

* * * * *